Patented Sept. 4, 1951

2,566,878

UNITED STATES PATENT OFFICE 2,566,878

SHIELD OR GUARD FOR BLOWER NOZZLES

Herman Fahrenkrog, near Walcott, and Henry D. Fahrenkrog, Davenport, Iowa

Application March 27, 1946, Serial No. 657,474

3 Claims. (Cl. 15—406)

Our present invention pertains to means for reducing injuries and lost time due to dust, chips, and the like getting into the eyes of workmen when blowing extraneous material out of holes in work pieces during operation thereon. Among the objects of this invention are the provision of improved means for preventing injuries to the eyes of workmen when they are working; the provision of means which will allow material to be blown out of holes and yet prevent such material from striking the faces of workmen and getting into their eyes; the provision of inexpensive means for the purpose stated which will be sufficiently cheap that it can be purchased by any workman having need for such apparatus; the provision of means for the purpose stated which can be easily manufactured and can be sold for a very moderate price; and such further objects, advantages, and capabilities as will hereafter appear and as are inherent in the construction disclosed herein. Our invention further resides in the combination, construction, and arrangement of parts illustrated in the accompanying drawings and, while we have shown therein what is now regarded as the preferred embodiment of this invention, we desire the same to be understood as illustrative only and not to be interpreted in a limiting sense.

In the drawings annexed hereto and forming a part hereof,

Figure 1:
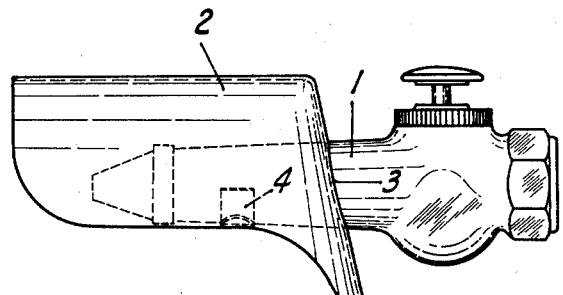
Fig. 1 shows a side elevation of an apparatus embodying our invention, attached to an air nozzle.
Figure 2:
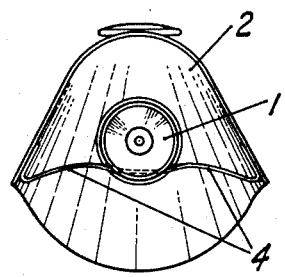
Fig. 2 is an end view of the structure shown in Fig. 1, looking into the left hand end of that structure, as viewed in Fig. 1.
Figure 3:
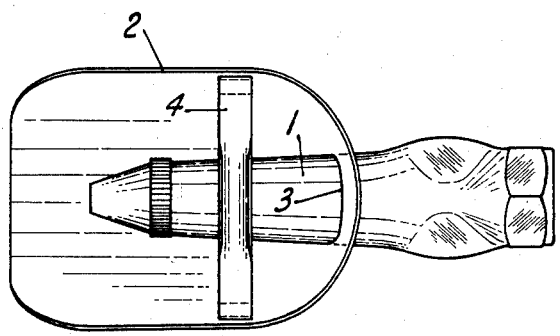
Fig. 3 is an underside view of the structure shown in Fig. 1, looking upwardly at that figure.

Reference will now be made in greater detail to the annexed drawings for a more complete description of this invention. In these drawings, the numeral 1 designates a blower nozzle which may be any one of several types now on the market. This nozzle is surrounded on top, two sides, and rearwardly by a housing 2 which is open at its forward end and the bottom side. The rearward end of the housing 2 is provided at 3 with an aperture for the reception of the nozzle 1, and there is a bridging member 4 extending across between two opposite sides of the housing and engaging the underside of the nozzle 1, to hold the parts in assembled relation. As shown in Fig. 1, the bridging member 4 is somewhat curved to increase the strength thereof and also to engage in a shallow groove in the under side of the blower nozzle. The housing 2 is, as shown, closed on the top, the back, and the two sides, thereby making the housing an arched body in its enclosure of the nozzle.

As will be understood by those using such apparatus, the blower nozzle 1, in use, is pointed into a hole from which it is desired to remove dust, chips of wood or other material, or other extraneous matter, and the valve is opened to permit air to pass through the nozzle. This guard, positioned over and around the opening, while permitting escape of the chips, prevents them from going backwardly into the face of the operator, and will thus prevent many trips to a doctor's office for the removal of such foreign matter, and also much loss of time. It will also be appreciated that this construction can be fabricated from sheet metal or molded from plastic, that it will therefore be inexpensive to manufacture, and that an ample number of such devices may be provided in any shop at no great expense. Sometimes, when working, the housing is pressed against the work piece and, when this is done, there is a tendency to force the housing out of place, but the cross-tie 4 tends to hold the housing in position and, in such circumstances, the housing is held firm.

It is of course understood that the specific description of structure set forth above may be departed from without departing from the spirit of this invention as disclosed herein and as defined in the appended claims.

Having now described our invention, we claim:

1. A dust and chip guard for a circular blower nozzle comprising an arched body having a fixed closure at one end of the arch provided with an aperture for the reception of a blower nozzle, the opposite end of the arch being open for the passage of air to the work piece from the nozzle, and a bridging member connecting two opposite walls of the arched body and serving to engage the nozzle if and when mounted in said aperture, whereby to hold the body in place on the nozzle when the guard is pressed against the work piece.

2. A structure for the purpose indicated comprising a housing of sheet material, closed on one end two sides and a third side connecting said two sides, the end closure being apertured for the reception of a circular blower nozzle, the second end being open for the passage of air moving from the nozzle to the work piece, and a bridging member extending across between opposite sides of the housing and holding them relatively fixed, said bridging member serving to engage a nozzle inserted in said aperture and hold the guard positioned relatively to said nozzle when the guard is pressed against the work piece.

3. An air nozzle to be used with air under pressure, a hood closed at three connected sides and having a closure member connecting said three sides at one end thereof to form a hood having a back closure wall, said back closure wall being approximately centrally apertured, the aperture fitting around the nozzle closely enough to hold the hood against movement relatively to the nozzle, the nozzle having a substantially circular discharge opening, and a cross-tie connecting the side walls of the hood and holding the hood against movement upwardly when the hood is pressed against a work piece.

HERMAN FAHRENKROG.
HENRY D. FAHRENKROG.

REFERENCES CITED

The following references are of record in the file of this patent:

UNITED STATES PATENTS

| Number | Name | Date |
|---|---|---|
| 838,943 | Boegel | Dec. 18, 1906 |
| 938,495 | Lunstrum | Nov. 2, 1909 |
| 1,173,801 | Hess | Feb. 29, 1916 |
| 1,893,606 | Wilson | Jan. 10, 1933 |
| 2,064,660 | Haas | Dec. 15, 1936 |

FOREIGN PATENTS

| Number | Country | Date |
|---|---|---|
| 131,458 | Switzerland | 1929 |